United States Patent
Rieux-Lopez et al.

(10) Patent No.: US 9,112,369 B2
(45) Date of Patent: Aug. 18, 2015

(54) SWITCHED-MODE POWER SUPPLY DEVICE AND AIRCRAFT INCLUDING AT LEAST ONE SUCH DEVICE

(71) Applicant: Airbus Operations SAS, Toulouse (FR)

(72) Inventors: Olivier Rieux-Lopez, Lisle sur Tarn (FR); Arnaud Davy, Pechbonnieu (FR); Thibault Pinchon, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 43 days.

(21) Appl. No.: 13/679,544

(22) Filed: Nov. 16, 2012

(65) Prior Publication Data
US 2014/0042803 A1 Feb. 13, 2014

(30) Foreign Application Priority Data
Nov. 18, 2011 (FR) ...................... 11 60537

(51) Int. Cl.
H02J 7/00 (2006.01)
H02M 3/158 (2006.01)
H02J 9/06 (2006.01)

(52) U.S. Cl.
CPC ............... *H02J 7/0055* (2013.01); *H02J 9/062* (2013.01); *H02M 3/1582* (2013.01)

(58) Field of Classification Search
USPC .......................................................... 307/9.1
See application file for complete search history.

(56) References Cited

U.S. PATENT DOCUMENTS

| 2003/0231009 | A1* | 12/2003 | Nemoto et al. ............... | 323/276 |
| 2012/0062045 | A1* | 3/2012 | Klein et al. .................... | 307/151 |
| 2012/0195077 | A1 | 8/2012 | Thomas et al. | |

FOREIGN PATENT DOCUMENTS

| EP | 1355403 | 10/2003 |
| FR | 2895167 | 6/2007 |
| WO | 2011003975 | 1/2011 |

OTHER PUBLICATIONS

LTC3780, (High Efficiency, Synchronous, 4-Switch Buck-Boost Controller), Jan. 1, 2005, pp. 1-28.*
French Search Report, Aug. 10, 2012.
An on line no-break with power factor correction and output voltage stabilization, Pacheco V M et al., Sep. 29, 2002.
High Efficiency, Sychronous, 4-Switch Buck-Boost Controller, Announcement Linear Technology, Jan. 1, 2005.
European Search Report, Mar. 1, 2013.

* cited by examiner

*Primary Examiner* — Rexford Barnie
*Assistant Examiner* — Xuan Ly
(74) *Attorney, Agent, or Firm* — Greer, Burns & Crain, Ltd

(57) ABSTRACT

A switched-mode power supply device including a charger connected on one side to a direct current electrical network, or rectified alternating current electrical network, a power reserve connected to a second side of the charger, and DC-DC output converters delivering regulated output voltages. The output converters are connected by an input to the first side of the charger. The charger is a current bidirectional, voltage unidirectional converter which, in a first phase, enables the power reserve to be recharged and maintained charged from the network, where the output converters are powered by the network and, in a second phase, in the presence of a power brown-out of the network, enables the power reserve to be discharged to power the output converters. A reverse blocking module is connected to the first side of the charger to disconnect the charger and the output converters from the network during the second phase.

3 Claims, 2 Drawing Sheets

SWITCHED-MODE POWER SUPPLY DEVICE AND AIRCRAFT INCLUDING AT LEAST ONE SUCH DEVICE

CROSS-REFERENCES TO RELATED APPLICATIONS

This application claims the benefit of the French patent application No. 1160537 filed on Nov. 18, 2011, the entire disclosures of which are incorporated herein by way of reference.

BACKGROUND OF THE INVENTION

The invention relates to a switched-mode power supply device which can be used notably in an aircraft, for example an airplane, and an aircraft including at least one such device.

The technical field of the invention is that of switched-mode power supply devices and that of the protection of the electrical devices which they power against network power brown-outs or the presence of a supply voltage below a threshold. Below this threshold the switched-mode power supply device no longer operates satisfactorily. In the remainder of the description, the term brown-out will be used, but this also encompasses a network supply voltage below the threshold.

A switched-mode power supply device is considered, which receives at its input a direct current voltage deriving from a direct current voltage network or, by extension, resulting from the rectification of an alternating current voltage deriving from an alternating current network, where the network is subject to a risk of brown-out. The goal of the invention is to enable this power supply device to continue to operate satisfactorily, i.e. to continue to supply its output voltages, during a network brown-out, when it is deprived of its energy source for a short time, or when it is powered by a voltage which is too low. In the case of a longer disconnection, the power source eventually ceases to operate, but with a certain delay, which can enable a powered device to stop under optimum conditions.

Most known solutions consist in incorporating an electrical power reserve, generally a capacitor, in the power supply device. This power reserve is charged and kept charged when a network voltage is present, in normal operation. It is used as an energy source, and is discharged to allow the power supply device to operate during a brown-out, when the network no longer supplies energy, either because it can no longer supply current, or because its voltage has fallen too low to be able to be used by the power supply device.

The invention concerns cases in which this power reserve is charged by a dedicated DC-DC converter called a charger, providing certainty that the quantity of stored energy does not depend on the value of the network voltage. The power supply device includes, in general in addition to the charger and the power reserve, DC-DC converters called output converters, the role of which is to deliver direct output voltages, where these output voltages are regulated and take on desired values: for example: +5 V; +3.3 V; +/−15 V, where these values are common in the field of aeronautics.

Depending on the way in which the charger and the power reserve are connected, the structure of the power reserve may be a "series" or "parallel" structure.

In a series structure, illustrated in FIG. 1, the charger 10 is connected by one input to a direct current power supply network RC. It is traversed by the full input power supplied by the network RC. It is connected by one output to a power reserve 11. Several output DC-DC converters 12 are connected by one input to the terminals of the power reserve 11. In the remainder of the description the term "several" means at least two. Output converters 12 supply at their output regulated output voltages VS.

After having traversed the charger 10, this input power is used, firstly, to charge the power reserve 11 and, secondly, by the output converters 12.

Such a series structure has the following advantages:

The inputs of the output converters 12 are subject to a direct current voltage which is regulated during normal operation, independently of the fluctuations of the network.

The output converters 12 are permanently connected to the power reserve 11. They are therefore not disrupted at the start of the brown-out, when they cease to use the energy of the network RC, and start using that of the power reserve 11. The same applies at the end of the brown-out.

Conversely:

The charger 10 permanently causes losses, including during normal operation.

To use the energy stored in the power reserve 11 satisfactorily, the output converters 12 must be able to operate with a voltage at their input which is much lower than that which is present during normal operation.

In a parallel structure, illustrated in FIG. 2, the charger 10 is shunt connected with the network RC. The power reserve 11 is connected to an output of the charger 10. The charger 10 takes only the power required to charge the power reserve 11. A switch 15 with two inputs and one output is present. Its output is connected to an input of the output converters 12. One of its inputs is connected to a node which is common to the output of the charger 10 and the power reserve 11. Its other input is connected to the network RC.

In a first position, the switch 15 connects the input of the output converters 12 to the power reserve 11; in a second position it connects the input of the output converters 12 to the network RC.

The output converters 12 are powered, in normal operation, by the network RC, i.e. upstream from the charger 10. The switch 15 is in the second position.

In the presence of a brown-out, the output converters 12 are powered by the power reserve 11. The switch 15 is in the first position.

It is preferable to install a parallel bypass capacitor 19 connected at the input of the output converters 12; it enables a sufficient voltage to be maintained at the input of the output converters 12 during operation of the switch 15.

Such a parallel structure has the following advantage. The charger 10 generates significant losses only during the period of initial charging of the power reserve 11.

Conversely, at the start of a brown-out, when the energy originating from the network RC ceases to be used, and instead that of the power reserve 11 is used, the output converters 12 must be disconnected from the network RC, and connected to the power reserve 11 using the switch 15. The same applies at the end of the brown-out. This leads to difficulties with, notably, the following risks: interrupted operation of the output converters 12, current peaks at the time of the connection between portions of circuits including capacitors charged at different voltages, oscillations, discharge of the power reserve 11 to the network RC, untimely oscillations of a decision-making logic intended to control the switch 15.

To use the energy stored in the power reserve 11 satisfactorily, the output converters 12 must be capable of operating across a wide input voltage range.

The output converters 12 experience at their inputs the variations of the network voltage RC in normal operation.

SUMMARY OF THE INVENTION

One aim of the present invention is to propose a switched-mode power supply device including a power reserve, and incorporating several DC-DC output converters, where this power device does not have the above limitations and difficulties.

One aim of the invention is, in particular, to propose such a switched-mode power supply device in which the output converters are powered by the network in normal operation, and by energy stored in a power reserve during a brown-out, but in which the output converters are not disrupted when their power supply switches from the network to the power reserve, and vice versa.

Another aim of the invention is to propose such a switched-mode power supply device in which the charger generates no significant losses continuously.

Yet another aim of the invention is to propose such a switched-mode power supply device in which the output converters experience at their inputs a regulated direct current voltage which is suitable for their operation when they are powered by the power reserve, independently of the voltage at the terminals of the power reserve.

To accomplish these aims the invention relates more specifically to a switched-mode power supply device including a charger intended to be connected on one side to a direct current, or rectified alternating current, electrical network, a power reserve connected to a second side of the charger, and output converters connected by one input to the first side of the charger. The charger is a current bidirectional, voltage unidirectional converter which, in a first phase, enables the power reserve to be recharged and maintained charged from the network, wherein the output converters are powered by the network and, in a second phase, in the presence of a network power brown-out, enables the power reserve to be discharged to power the output converters. A reverse blocking module is connected to the first side of the charger to disconnect the charger and the output converters from the network during the second phase.

The reverse blocking module may include a diode, or at least one controllable component, such as a transistor, a switch, a mechanical relay, a current unidirectional switch element, or a diode installed in parallel with a switch and a module to control the controllable component or switch.

A bus with two conductors can connect the first side of the charger to the input of the output converters.

The charger can advantageously include at least one switching cell with two switches which have a common point connected at one end to the power reserve, and at the other end to a conductor of the bus, wherein an inductor is inserted between the other conductor of the bus and the point common to both switches, and wherein a control unit controls the switches of said at least one switching cell.

The control unit may include:
- a current measurement module measuring a current flowing in the inductor or in the switches of the switching cell;
- a unit for shaping reference currents and for arbitrating between them, receiving at its input a reserve voltage taken from the terminals of the power reserve, a bus voltage taken between the two bus conductors, a reserve voltage set point, a bus voltage set point, generating a reference current for the bus voltage, corresponding to a current set point in the inductor able to regulate the bus voltage, and a reference current for the reserve voltage, corresponding to a current set point in the inductor able to regulate the reserve voltage, and arbitrating between the reference current for the bus voltage and the reference current for the reserve voltage in the form of a control current set point;
- a current limiting module connected at its input to an output of the shaping unit, limiting the control current set point, and delivering a saturated control current set point;
- a peak current regulating module connected at its input to one output of the current measurement module and to an output of the current limiting module;
- a current comparison unit which generates charge and discharge authorization signals from the saturated control current set point and minimum charge and discharge current values, connected to one input, at the output of the current limiting module;
- a clock module;
- a unit to synchronize charge and discharge authorizations, connected at its input to the clock module, and to an output of the current comparison unit;
- a unit for generating signals to control the switches of the switching cell, connected at its input to an output of the peak current regulating module, and to an output of the charge and discharge authorizations synchronization unit, and to the clock module, and delivering at its output the signals to control the switches of the switching cell.

The reference current for the bus voltage is used to regulate the bus voltage and the reference current for the reserve voltage is used to regulate the reserve voltage, wherein the control current set point is the larger of the reference current value for the bus voltage and the reference current value for the reserve voltage.

The reverse blocking module can be controlled by the discharge authorization signal.

The present invention also relates to an aircraft in which at least one switched-mode power supply device characterized in this manner is installed.

BRIEF DESCRIPTION OF THE DRAWINGS

The present invention will be better understood on reading the description of examples of embodiment given, purely as an indication and in no sense restrictively, making reference to the appended illustrations in which.

Identical, similar or equivalent parts of the various figures have the same numerical references, to make it easier to go from one figure to another.

DETAILED DESCRIPTION OF THE PREFERRED EMBODIMENTS

Figure 1:
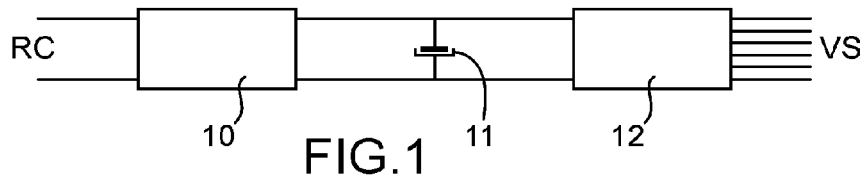
FIGS. 1 and 2 (previously described) illustrate two switched-mode power supply devices of the prior art.
Figure 2:
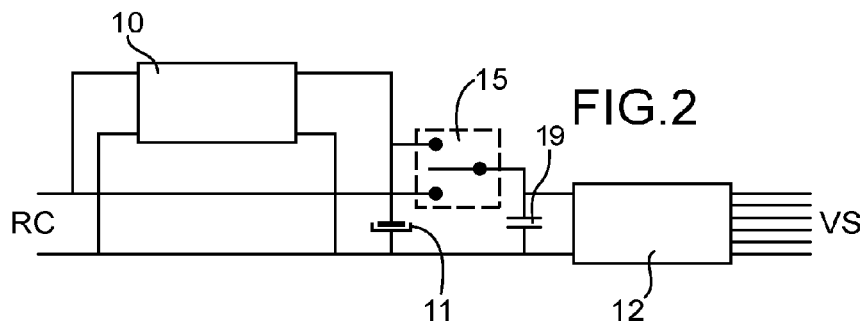
Figure 3:
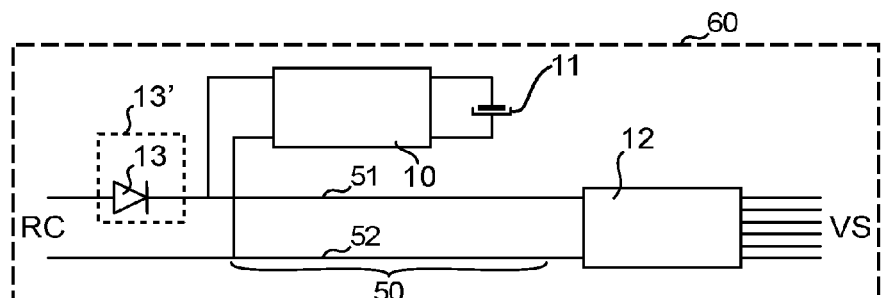
FIG. 3 illustrates schematically the switched-mode power supply device of the invention.

As illustrated in FIG. 3, in the switched-mode power supply device of the invention, the charger 10 is used both to charge and to discharge the power reserve 11.

In this switched-mode power supply device, the charger 10 is connected, on a first side called "input", to the direct current electrical network, or rectified alternating current electrical network RC, through a reverse blocking module 13' represented in FIG. 3 by a diode 13, and on a second side called "output", to the power reserve 11. The output DC-DC converters 12 are connected, at their input, to the first side of the charger 10 and deliver at their output regulated direct voltages VS.

The reverse blocking module 13' can be formed from a diode. It enables the power supply of the network RC to be disconnected during the brown-out, and prevents power deriving from the power reserve 11 reaching the network RC. The power reserve 11 will thus not be discharged in the network RC, but in the output converters 12. The operation of the switched-mode power supply device forming the subject of the invention will be explained below.

As a variant, the reverse blocking module 13' could be formed by at least one controllable component such as a transistor, a switch, a mechanical relay or any other current unidirectional switch element, and by a control module to control it. These elements are not illustrated, in order not to increase needlessly the number of figures. According to another variant illustrated in FIG. 5, the reverse blocking module 13' could be formed from a diode 13 installed in parallel with a controlled switch 14 (for example, a MOSFET transistor), in order to reduce the voltage at its terminals, and from a control module 16 of the controlled switch 14.

The charger 10 is a current bidirectional, voltage unidirectional converter. This is the reason that mention was made of a first side and a second side when the charger 10 was described.

A connection connecting the first side of the charger 10 to the input of the output converters 12 is called bus 50. It is formed from two electrical conductors 50, 52.

The present invention also relates to an aircraft 60 which includes a switched-mode power supply device according to the invention.

EXAMPLE EMBODIMENT

Figure 4:
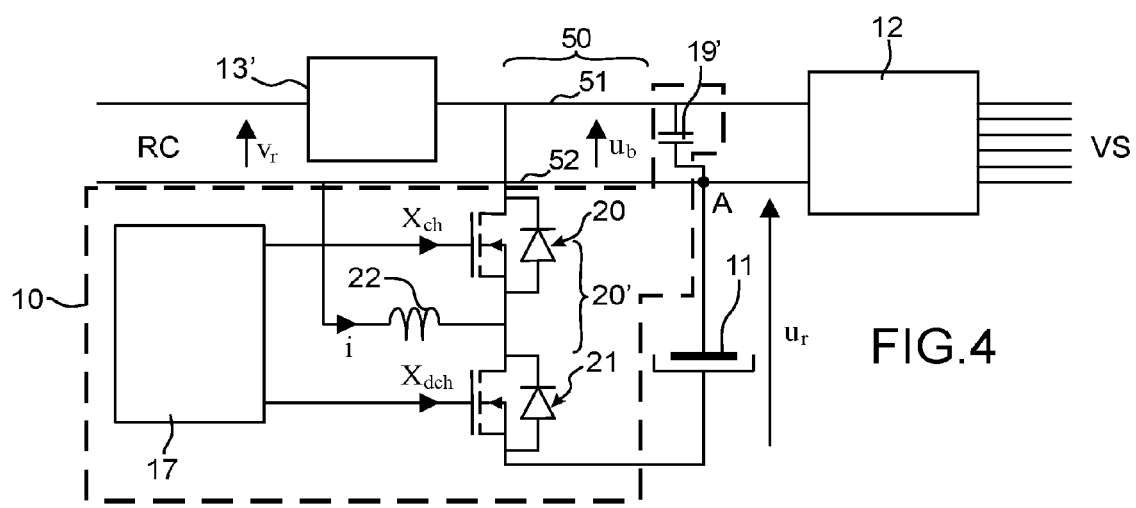
FIG. 4 shows an example embodiment of a switched-mode power supply device of the invention, where the charger is illustrated in greater detail.
Figure 5:
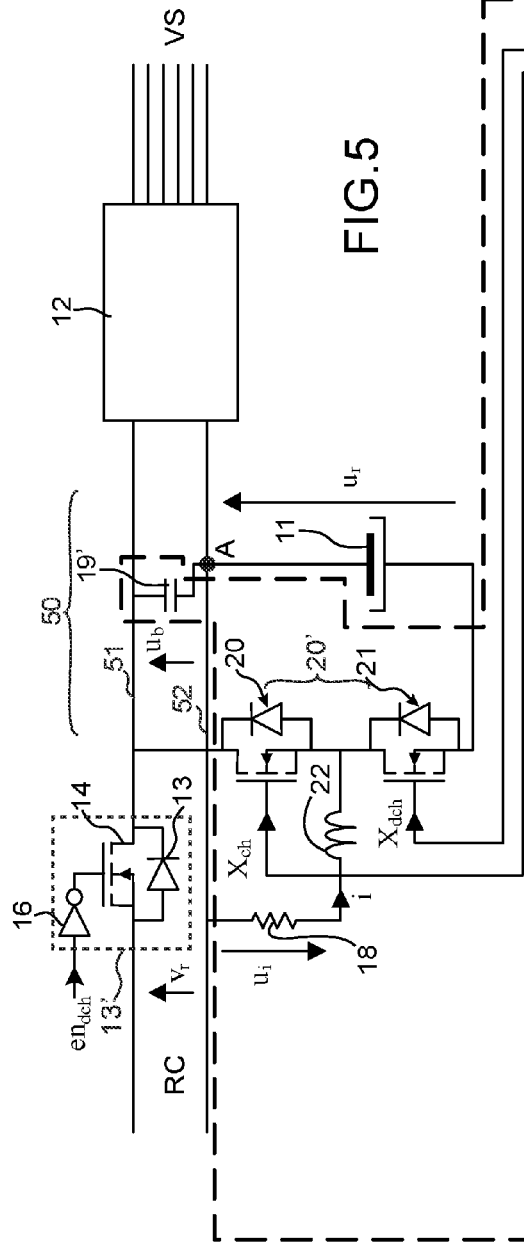
FIG. 5 shows an example embodiment of a switched-mode power supply device of the invention, where the charger and its control device are illustrated in greater detail.
Figure 5:
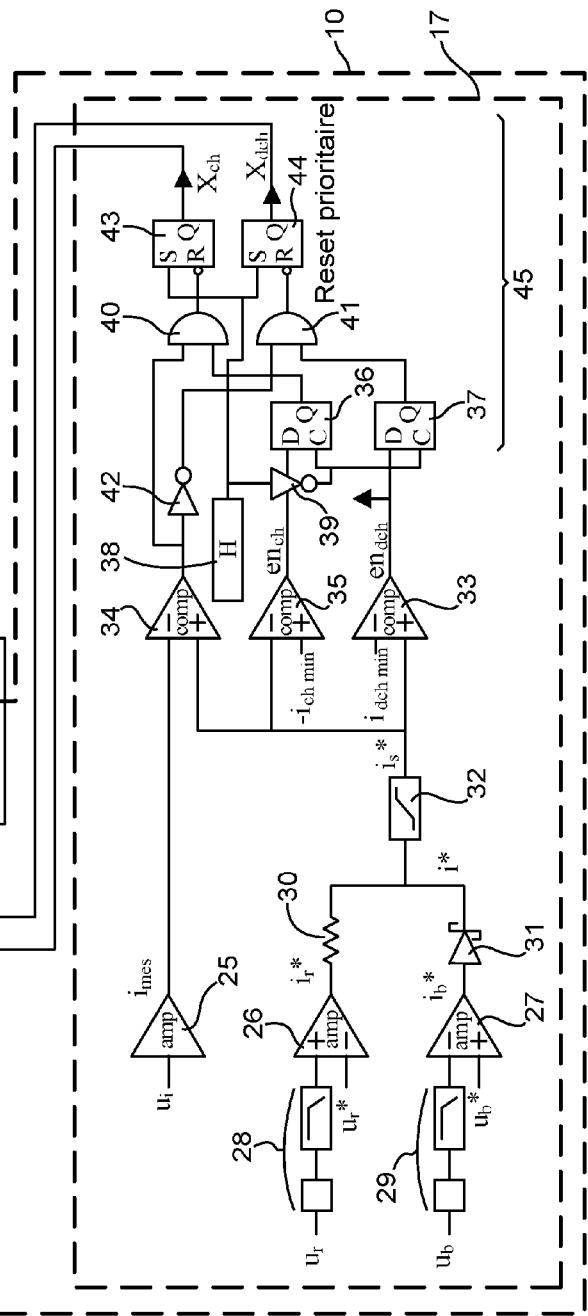

In an example embodiment illustrated in FIGS. 4 and 5, a reversing topology called a buck-boost is used for the charger 10. This topology has the feature that it has an output voltage the sign of which is opposite that of the input voltage.

The charger 10 includes at least one switching cell 20' formed from two switches 20, 21 which are connected to one another, and which have a common point. Each of the switches may be formed, for example, from a MOSFET transistor which can be installed in antiparallel with a diode. The switching cell 20' is connected at one end to one of the bus conductors 51, and at the other end to a terminal of the power reserve 11. The switch 20 is connected to one of the conductors 51 of the bus 50, and the switch 21 is connected to the power reserve 11. The other terminal of the power reserve 11 is connected to the other conductor 52 of the bus 50 at a point A. A control unit 17 is used to control the switches 20, 21 and therefore to control charging and discharging of the power reserve 11. Each switching cell 20' cooperates with an inductor 22 which is connected firstly to point A and secondly to the point common to the switches 20, 21. The inductor 22 can be installed in series with a resistor 18 which is used to measure a current i which will traverse the inductor 22 when the switched-mode power supply device forming the subject of the invention is used, as in FIG. 5. It is possible for this resistor to be absent as in FIG. 4, and replaced by an appropriate current sensor (not represented).

The charger 10 also includes a capacitor 19' installed at the input of the output converters 12. Its role is to absorb alternating current components flowing in the bus 50, generated by the switching cell 20'.

A voltage delivered by the network RC or network voltage is called $v_r$. A voltage between the conductors 51, 52 of the bus 50 or bus voltage is called $u_b$, and a voltage at the terminals of the power reserve 11 or reserve voltage is called $u_r$.

In the example of FIG. 5, the reverse blocking module 13' is formed from the diode 13, from the controlled switch 14, which in this case is a transistor, and from the module 16 which controls whether controlled switch 14 is in the on or off state.

The control unit 17 delivers to the switch 20 a control signal $X_{ch}$ which is used for charging, and to the switch 21 a control signal $X_{dch}$ which is used for discharging.

In operation, management of the bus voltage $u_b$ and management of the reserve voltage $u_r$ are as follows:

When the network voltage $v_r$ is sufficient, in a first phase or charging phase, the power reserve 11 is charged at the reserve voltage $u_r$, and the reserve voltage $u_r$ is then maintained. The output converters 12 are powered from the network RC.

When the network voltage $v_r$ is insufficient, which in this context corresponds to a brown-out, and when so allowed by the reserve voltage $u_r$, in a second phase or discharge phase, the bus voltage $u_b$ is maintained at a sufficient level for satisfactory operation of the output converters 12. The output converters 12 are powered from the power reserve 11

In this context, sufficient network voltage $v_r$ means that it is higher than a threshold, where this threshold is such that if it is not exceeded, the output converters 12 operate in a disrupted fashion; they cannot provide output voltages VS having the desired values. In a similar manner, the bus voltage $u_b$ has a sufficient level if it is higher than this threshold.

Such a charger structure has above all the advantage that it allows a charging or discharging current to exist, whether the reserve voltage $u_r$ is greater than or less than the bus voltage $u_b$. In particular, the charge current continues to be controlled when the power reserve 11 is completely discharged. In addition, great freedom exists to determine the voltage $u_r$ for charging the power reserve 11 in normal operation and the bus voltage $u_b$ during the brown-out.

An example embodiment of the control unit 17 will now be described, making reference to FIG. 5. This control unit 17 includes:

- a current measuring module 25,
- a unit 26, 27, 28, 29, 30 and 31 for shaping reference currents and arbitrating between them,
- a current limiting module 32,
- a peak current regulating module 34, 42,
- a current comparison unit 33, 35 which generates charge and discharge authorization signals ($en_{ch}$, $en_{dch}$),
- a unit 36, 37 for synchronizing charge and discharge authorisation signals,
- a clock module 38, 39,
- a unit 40, 41, 43, 44 for generating signals to control the switches of the switching cell.

The function of each of these modules and units will subsequently be described, together with their layout relative to one another.

The current measuring module 25 is situated in a first channel. It receives a voltage $u_i$ measured at the terminals of the resistor 18 and delivers a signal $i_{mes}$ which is representative of the current actually flowing in the inductor 22, and which is measured by this means. The current measuring module 25 is realized by a negative-gain amplifier. As a variant the current could have been measured in the switches 20, 21 of the switching cell.

The unit 26, 27, 28, 29, 30 and 31 for shaping reference currents and arbitrating between them includes, in a second channel, a first amplifier 26, and in a third channel a second amplifier 27.

The first amplifier 26 receives at a + input the reserve voltage $u_r$ (the voltage at the terminals of the power reserve 11) after conditioning in a conditioning circuit 28, and at a—input a reserve voltage set point $u_r^*$. It delivers a signal $i_r^*$ at the output. The signal $i_r^*$ is a reference current for the reserve voltage corresponding to a current set point in the inductor 22 which is able to regulate the reserve voltage $u_r$.

The second amplifier 27 receives at a + input the bus voltage $u_b$ (at the input of the output converters 12) after conditioning in a conditioning circuit 29, and at a – input a bus voltage set point $u_b^*$. It delivers at its output a signal $i_b^*$. The signal $i_b^*$ is a reference current for the bus voltage corresponding to a current set point in the inductor 22 which is able to regulate the bus voltage $u_b$. The bus voltage set point $u_b^*$ is chosen such that, when the bus voltage $u_b$ is less than this set point $u_b^*$, the energy of the network RC is used to power the output converters 12 and, when the bus voltage $u_b$ is higher than this set point $u_b^*$, the energy of the power reserve 11 is used to power the output converters 12.

The reserve voltage set point $u_r^*$ is chosen such that, firstly, it preserves the power reserve 11 and, secondly, it is able to store in it sufficient energy to power the output converters 12.

A choice must then be made as to which reference current between signals $i_b^*$ and $i_r^*$ will be used to control the current in inductor 22, where this control is accomplished by the peak current regulating module 34, 42 and by the current comparison unit 33, 35.

In order to allow an arbitration between the reference currents $i_r^*$ and $i_b^*$, the reference current for the reserve voltage $i_r^*$ is input into a resistor 30 connected by one end to the output of the first amplifier 26, and the reference current for bus voltage $i_b^*$ is input into a Schottky diode 31 an anode of which is connected to the output of the second amplifier 27. The other end of the resistor 30 and the cathode of Schottky diode 31 are connected together at a common point at which a control current set point i* appears.

The control current set point i* is equal to that of reference currents $i_r^*$ and $i_b^*$ which is algebraically the greater (i.e. the one which is more inclined towards a transfer of energy from the power reserve 11 to the bus 50). Indeed if, for example, the reserve voltage $u_r$ is greater than the reserve voltage set point $u_r^*$, the reference current for the reserve voltage $i_r^*$ is positive ($i_r^* > 0$), and if the bus voltage $u_b$ is greater than the bus voltage set point ub*, and then also the reference current for the bus voltage $i_b^*$ is negative ($i_b^* < 0$), the power reserve 11 and not the bus must be discharged, which means that the current set point i* must be positive (i*>0). Similarly, if the reserve voltage $u_r$ is lower than the reserve voltage set point $u_r^*$, the reference current for the reserve voltage is negative ($i_r^* < 0$), and if the bus voltage $u_b$ is lower than the bus voltage set point $u_b^*$, and then also the reference current for the bus voltage $i_b^*$ is positive ($i_b^* > 0$), the power reserve 11 and not the bus must be discharged, which means that the current set point i* must be positive (i*>0).

This common point is also connected to the input of a current limiting module 32, which delivers at its output a saturated control current set point is which demonstrates a desired current i flowing in the inductor 22 appropriated for the output voltages VS to be able to have the desired values. This current i is counted positively in the direction of the arrow (see FIG. 5).

The control current set point i* is saturated by the current limiting module 32 when positive at a value $i_{max}^*$ and when negative at a value $i_{min}^*$.

The output of the current limiting module 32 is connected to a + input of a first current comparator 34 which receives at a – input the signal $i_{mes}$. This first current comparator 34 forms part of the peak current regulating module.

The output of the current limiting module 32 is also connected to a + input of a second current comparator 33 which receives a signal $i_{dchmin}$, at a – input.

The output of the current limiting module 32 is also connected to a – input of a third current comparator 35 which receives a – signal $i_{chmin}$, at a + input.

Second and third current comparators 33, 35 form part of the current comparison unit.

Signals $i_{dchmin}$ and $i_{chmin}$ are equal to values of the absolute value of the saturated control current set point is below which it is preferable for the charger to deliver no current, for reasons of energy economy and stability of regulation. They are also called the minimum charge or discharge current.

The first current comparator 34 delivers a signal to open one or other of the switches 20, 21 of the switching cell 20'.

The second current comparator 33 delivers a signal $en_{dch}$ which is an authorization to discharge the power reserve 11. Signal $en_{dch}$ is used to control the reverse blocking module 13'. The control module 16 of the controlled switch 14 is a NO gate. The switch 14 is open when the discharge occurs.

The third current comparator 35 delivers a signal $en_{ch}$ which is an authorization to charge the power reserve 11.

The charge or discharge authorizations $en_{ch}$ and $en_{dch}$ at the output of the second and third comparators 35 and 33 depend on the sign and amplitude of the saturated control current set point is*. To maintain the charge a packet-based operation is used.

The outputs of second and third comparators 33, 35, which deliver authorization signals $en_{ch}$ and $en_{dch}$, are connected to a module 45 for synchronizing these authorization signals $en_{ch}$ and $en_{dch}$.

This synchronization module 45 includes a first and second toggle D 36 and 37.

This type of toggle D, also called a lock, has a data input D, a clock input C and an output Q. The output Q copies the data input D while its clock input C is at a high level. The output Q remains locked in its previous state while the clock input C is at a low level.

The control unit 17 therefore includes a clock module with a clock 38 and a NO gate 39, one input of which is connected to the output of clock 38. The NO gate 39 is connected at its output to the input C of each of toggles D 36 and 37. The toggles D 36 and 37 therefore receive at their clock input C a clock signal which is inverted relative to a clock signal delivered by the clock 38.

The input D of the first toggle D 36 is connected to the output of the third current comparator 35.

The input D of the second toggle D 37 is connected to the output of the second current comparator 33. These toggles D 36, 37 are used to ensure that the change between network power supply and power supply by the power reserve, and vice versa, i.e. the transition between the first phase and the second phase and/or the reverse, never occurs when one of switches 20, 21 of the switching cell 20' is closed.

The control unit 17 also includes a unit 40, 41, 43, 44 for controlling switches 20, 21 of the switching cell 20'. This unit for controlling switches 20, 21 of the switching cell 20' includes a first AND gate 40 and a second AND gate 41.

A first input of the first AND gate 40 is connected to the output of the first current comparator 34, and a second input is connected to an output Q of the first toggle D 36.

A first input of the second AND gate 41 is connected to the output of a NO gate 42 an input of which is connected to the output of the first current comparator 34, and a second input of which is connected to an output Q of the second toggle D 37. This NO gate 42 forms part of the peak current regulating module.

The unit for controlling switches 20, 21 of the switching cell 20' also includes a first toggle RS 43 and a second toggle RS 44. These RS toggles have an S or Set input which is active on a rise front, acting as an inhibition at low level, and an priority R or Reset input which is active at low level.

The input S of both these toggles RS 43, 44 is connected to the output of the clock 38.

The input R of the first toggle RS is connected to the output of the first AND gate 40. The input R of the second toggle RS 44 is connected to the output of the second AND gate 41.

An output Q of the first toggle RS 43 is connected to the switch 20 to control it; this output Q delivers chopping control signal $X_{ch}$ for the first phase or phase of charging of the power reserve 11.

An output Q of the second toggle RS 44 is connected to the switch 21 to control it; this output Q delivers chopping control signal $X_{dch}$ for the second phase or phase of discharging of the power reserve 11.

To summarize, by virtue of the control unit 17 a preferred control strategy is as follows:

the reserve voltage set point $u_r^*$ and the bus voltage set point $u_b^*$ are acquired, or in other words are defined, as described above;

the reference current for the reserve voltage $i_r^*$ is generated from the reserve voltage $u_r$ and from the reserve voltage set point $u_r^*$;

the reference current for the bus voltage $i_b^*$ is generated from the bus voltage $u_b$ and from the bus voltage set point $u_b^*$;

the control current set point i* is generated by choosing that of the reference currents $i_b^*$ and $i_r^*$ which is algebraically greater;

the saturated control current set point $i_s^*$ is generated from the control current set point i*.

The current which will flow in the inductor 22 according to the saturated control current set point $i_s^*$ is controlled and, to do so, in an exclusive command, depending on the sign of $i_s^*$, that of the switches 20, 21 of the charger 10 which must be controlled is determined, where the other non-controlled switch then remains permanently open, and where only its antiparallel diode conducts current. This has the advantage that it reduces current ripple in all cases in which the current in the inductor 22 is cancelled (intermittent conduction). It is known that for a given power and converter frequency, minimum volume inductor requires operation with intermittent conduction. It is also known that regulation of the inverting structure is simpler and more efficient with intermittent conduction. In particular, this enables a near-zero effective current to be obtained in the inductor 22 in normal operation, i.e. when the charger 10 is working only to maintain the charge of the power reserve 11. The preferred method to accomplish control of the current is the peak current mode method, applied to the absolute value of the current.

One of the advantages of this strategy is as follows:

The constitution of i* as the choice of the larger of the values $i_b^*$ and $i_r^*$, which accomplishes a transition from one mode to the other (from $i^*=i_b^*$ to $i^*=i_r^*$ and vice versa), introduces no intermittence in relation to i*, and therefore no disruption of the device of the invention.

It also allows operation without oscillations at the intersection of the two phases. In particular, when the network RC is of high impedance and/or when the charge current is very high, for example at least three times the steady state current, if the current absorbed in the network RC to charge the power reserve 11 causes the network voltage $v_r$ to fall to around $u_b^*$, the regulation of the bus voltage $u_b$ occurs simultaneously with the charging of the power reserve 11 (with a smaller current), thus preventing a more substantial collapse of the network RC, or possible oscillations. Such a property enables the current to charge the power reserve 11 to be regulated (via $i_{min}^*$), so as to obtain very rapid charging when the network RC is of low impedance, without this posing problems when the network RC is of high impedance.

The existence of two separate voltage loops means that settings can differ according to the requirements. Indeed, the presence of capacitors of different values for the two voltages to be regulated may require different gains.

It is also possible to adjust the gain according to the sign of i*.

To control the current in the inductor 22 according to saturated control current set point $i_s^*$ there is another possible strategy. In an additional control, both switches 20 and 21 of the charger 10 are controlled in complementary fashion. The current in the inductor 22 therefore has a sawtooth wave, the shape of which is qualitatively the same, whether it takes exclusively positive values, exclusively negative values, or positive and negative values (which is the case, for example, if the saturated control current set point $i_s^*$ is close to zero). The properties of the current loop are therefore independent of the sign and of the value of the saturated control current set point $i_s^*$, which simplifies adjustment of the voltage loops. Conversely, the current of the inductor 22 permanently has a substantial ripple, leading to significant losses. The current may be controlled, for example by a hysteresis control, or alternatively by a calculation of the cyclic ratio taken from a proportional corrector or proportional-plus-integral control.

The switched-mode power supply device of the invention has the following advantages:

it uses a charger which in the first phase (charging phase) enables the power reserve to be charged, and which in the second phase (discharging phase) enables the power reserve to be discharged without any modification of the topology according to the operational phases.

At their input the output converters are subject to a direct current voltage which is regulated during the use of the power reserve (brown-out) independently of the voltage at the terminals of this power reserve.

The output converters are permanently connected (by the charger) to the power reserve. They are therefore not disrupted at the start of the brown-out, when they cease to use the energy of network, and start using that of the power reserve. The same applies at the end of the brown-out.

The charger causes significant losses only during the period of initial charging of the power reserve, and during the brown-out.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A switched-mode power supply device including:
a charger intended to be connected at a first side to a network comprising one of a direct current electrical network and a rectified alternating current electrical network,
a power reserve connected to a second side of the charger,
output DC-DC converters delivering regulated output voltages,
the output converters being connected by one input to the first side of the charger,
wherein the charger is a current bidirectional, voltage unidirectional converter which, in a first phase, enables the power reserve to be recharged and maintained charged from the network,
wherein the output converters are powered by the network and, in a second phase, in the presence of a power brown-out of the network, enables the power reserve to be discharged to power the output converters, and
wherein the power supply device also includes a reverse blocking module connected to the first side of the charger to disconnect the charger and the output converters of the network during the second phase,
wherein a bus with two conductors connects the first side of the charger to the input of the output converters,
wherein the charger includes at least one switching cell with two switches which have a common point connected at one end to the power reserve, and at the other end to a first conductor of the bus,
wherein an inductor is inserted between a second conductor of the bus and the point common to both switches,
wherein a control unit controls the switches of said at least one switching cell,
wherein the control unit includes:
a current measurement module measuring a current flowing in one of the inductor and the switches of the switching cell;
a shaping unit for shaping reference currents and for arbitrating between them, receiving at its input a reserve voltage taken from the terminals of the power reserve, a bus voltage taken between the two bus conductors, a reserve voltage set point, a bus voltage set point, and generating a reference current for the bus voltage, and a reference current for the reserve voltage, and arbitrating between these reference currents in the form of a control current set point, the reference current for the bus voltage being used to regulate the bus voltage and the reference current for the reserve voltage being used to regulate the reserve voltage, wherein the control current set point is the larger of the reference current value for the bus voltage and the reference current value for the reserve voltage;
a current limiting module connected at its input to an output of the shaping unit, for limiting the control current set point, and delivering a saturated control current set point;
a peak current regulating module connected at its input to an output of the current measurement module and to an output of the current limiting module;
a current comparison unit which generates charge and discharge authorization signals from the saturated control current set point and minimum charge discharge current values, connected at one input to the output of the current limiting module;
a clock module;
a charge and discharge authorizations synchronization unit to synchronize charge and discharge authorizations, connected at its input to the clock module, and to an output of the current comparison unit;
a generating unit for generating signals to control the switches of the switching cell, connected at its input to an output of the peak current regulating module, and to an output of the charge and discharge authorizations synchronization unit, and to the clock module, and delivering at its output the signals to control the switches of the switching cell,
wherein the reverse blocking module is controlled by the discharge authorization signals.

2. The device according to claim 1, wherein the reverse blocking module includes at least one of a diode and a controllable component from the group consisting of a transistor, a switch, a mechanical relay, a current unidirectional switch element, and a diode installed in parallel with a switch, and a module to control the at least one of a diode and a controllable component.

3. An aircraft including at least one power supply device including:
a charger intended to be connected by a first side to a direct current electrical network, or rectified alternating current electrical network,
a power reserve connected to a second side of the charger,
output DC-DC converters delivering regulated output voltages,
wherein the output converters are connected by one input to the first side of the charger,
wherein the charger is a current bidirectional, voltage unidirectional converter which, in a first phase, enables the power reserve to be recharged and maintained charged from the network,
wherein the output converters are powered by the network and,
in a second phase, in the presence of a power brown-out of the network, enables the power reserve to be discharged to power the output converters, and
wherein the power supply device also includes a reverse blocking module connected to the first side of the charger to disconnect the charger and the output converters of the network during the second phase,
wherein a bus with two conductors connects the first side of the charger to the input of the output converters,
wherein the charger includes at least one switching cell with two switches which have a common point connected at one end to the power reserve, and at the other end to a first conductor of the bus,
wherein an inductor is inserted between a second conductor of the bus and the point common to both switches,
wherein a control unit controls the switches of said at least one switching cell,
wherein the control unit includes:
a current measurement module measuring a current flowing in one of the inductor and the switches of the switching cell;
a shaping unit for shaping reference currents and for arbitrating between them, receiving at its input a reserve voltage taken from the terminals of the power reserve, a bus voltage taken between the two bus conductors, a reserve voltage set point, a bus voltage set point, and generating a reference current for the bus voltage, and a reference current for the reserve voltage, and arbitrating between these reference currents in the form of a control current set point, the reference current for the bus voltage being used to regulate the bus voltage and the reference current for the reserve voltage being used to regulate the reserve voltage, wherein the control current set point is the larger of the reference current value for the bus voltage and the reference current value for the reserve voltage;

a current limiting module connected at its input to an output of the shaping unit, for limiting the control current set point, and delivering a saturated control current set point;

a peak current regulating module connected at its input to an output of the current measurement module and to an output of the current limiting module;

a current comparison unit which generates charge and discharge authorization signals from the saturated control current set point and minimum charge discharge current values, connected at one input to the output of the current limiting module;

a clock module;

a charge and discharge authorizations synchronization unit to synchronize charge and discharge authorizations, connected at its input to the clock module, and to an output of the current comparison unit;

a generating unit for generating signals to control the switches of the switching cell, connected at its input to an output of the peak current regulating module, and to an output of the charge and discharge authorizations synchronization unit, and to the clock module, and delivering at its output the signals to control the switches of the switching cell, wherein the reverse blocking module is controlled by the discharge authorization signals.

* * * * *